(12) United States Patent
Min et al.

(10) Patent No.: US 9,095,987 B2
(45) Date of Patent: Aug. 4, 2015

(54) DEVICE FOR CUTTING ELECTRODE SHEET AND SECONDARY BATTERY MANUFACTURED USING THE SAME

(71) Applicant: LG CHEM, LTD., Seoul (KR)

(72) Inventors: Ki Hong Min, Gwacheon-si (KR); Sung Min Hwang, Cheongju-si (KR); Jihoon Cho, Daejeon (KR); TaeYoon Jung, Cheongwon-gun (KR); Jeong Sam Son, Cheongju-si (KR); Su Taek Jung, Cheongju-si (KR); Changmin Han, Cheongju-si (KR); Hyun-sook Baik, Cheongju-si (KR); Sung Hyun Kim, Cheongju-si (KR); Ki Hun Song, Hwaseong-si (KR); Sang Hyuck Park, Suwon-si (KR); Han Sung Lee, Incheon (KR); Byeong Geun Kim, Anyang-si (KR)

(73) Assignee: LG CHEM, LTD., Seoul (KR)

( * ) Notice: Subject to any disclaimer, the term of this patent is extended or adjusted under 35 U.S.C. 154(b) by 129 days.

(21) Appl. No.: 13/887,647

(22) Filed: May 6, 2013

(65) Prior Publication Data

US 2013/0244083 A1    Sep. 19, 2013

Related U.S. Application Data

(63) Continuation of application No. PCT/KR2011/008477, filed on Nov. 8, 2011.

(30) Foreign Application Priority Data

Dec. 2, 2010    (KR) .................. 10-2010-0122331

(51) Int. Cl.
*H01M 6/42* (2006.01)
*B26D 7/01* (2006.01)
(Continued)

(52) U.S. Cl.
CPC ............. *B26D 7/015* (2013.01); *B26D 1/085* (2013.01); *B26D 5/02* (2013.01); *B26D 5/16* (2013.01);
(Continued)

(58) Field of Classification Search
None
See application file for complete search history.

(56) References Cited

U.S. PATENT DOCUMENTS

| 4,881,883 A | 11/1989 | Michimoto et al. |
| 2002/0192548 A1* | 12/2002 | Schaefer et al. ............ 429/209 |

(Continued)

FOREIGN PATENT DOCUMENTS

| CN | 1270134 A | 10/2000 |
| CN | 201313323 Y | 9/2009 |

(Continued)

OTHER PUBLICATIONS

International Search Report issued PCT/KR2011/008477, mailed on May 8, 2012.

*Primary Examiner* — Patrick Ryan
*Assistant Examiner* — Jose Colucci Rios
(74) *Attorney, Agent, or Firm* — Birch, Stewart, Kolasch & Birch, LLP

(57) ABSTRACT

Disclosed is a device for cutting an electrode sheet laminate wherein two or more continuous electrode sheets, in which an electrode active material is applied to one or both surfaces thereof, are laminated, to form a plurality of unit electrode laminates from the electrode sheet laminate, the device including a cutter to cut the electrode sheet laminate at a set position and thereby form unit electrode laminates, and two or more transport grippers arranged at the front of the cutter based on a feed direction of the electrode sheet laminate, the transport grippers drawing and transporting the electrode sheet laminate by one pitch, a size corresponding to the unit electrode laminate according to operation of the cutter, wherein while one of the transport grippers draws and transports the electrode sheet laminate, the remaining transport grippers move to a position for drawing.

18 Claims, 3 Drawing Sheets

(51) Int. Cl.
  *B26D 5/02*   (2006.01)
  *B26D 5/38*   (2006.01)
  *H01M 4/04*   (2006.01)
  *B26D 1/08*   (2006.01)
  *B26D 5/16*   (2006.01)
  *H01M 10/04*  (2006.01)

(52) U.S. Cl.
  CPC ............... *B26D 5/38* (2013.01); *H01M 4/0404* (2013.01); *H01M 10/0404* (2013.01); *H01M 10/0413* (2013.01); *H01M 10/0418* (2013.01); *H01M 2220/20* (2013.01)

(56) References Cited

U.S. PATENT DOCUMENTS

| | | | |
|---|---|---|---|
| 2004/0013812 A1* | 1/2004 | Kollmann et al. | 427/437 |
| 2004/0191634 A1* | 9/2004 | Yanagawa et al. | 429/246 |
| 2005/0214647 A1* | 9/2005 | Tanaka et al. | 429/233 |
| 2007/0277370 A1* | 12/2007 | Kalynushkin et al. | 29/730 |
| 2009/0100669 A1* | 4/2009 | Ikeda et al. | 29/623.2 |

FOREIGN PATENT DOCUMENTS

| | | |
|---|---|---|
| JP | 2529959 B2 | 9/1996 |
| JP | 9-295073 A | 11/1997 |
| JP | 10-64527 A | 3/1998 |
| JP | 10-328767 A | 12/1998 |
| JP | 2000-285908 A | 10/2000 |
| JP | 2001-297754 A | 10/2001 |
| JP | 2010-67507 A | 3/2010 |
| KR | 10-2004-0079522 A | 9/2004 |
| KR | 10-2006-0025276 A | 3/2006 |
| KR | 10-2006-0080092 A | 7/2006 |
| KR | 10-2007-0007522 A | 1/2007 |
| KR | 10-2007-0064764 A | 6/2007 |

* cited by examiner

DEVICE FOR CUTTING ELECTRODE SHEET AND SECONDARY BATTERY MANUFACTURED USING THE SAME

CROSS REFERENCE TO RELATED APPLICATIONS

This application is a Continuation of PCT International Application No. PCT/KR2011/008477 filed on Nov. 8, 2011, which claims priority under 35 U.S.C. §119(a) to Patent Application No. 10-2010-0122331 filed in the Republic of Korea on Dec. 2, 2010, all of which are hereby expressly incorporated by reference into the present application.

TECHNICAL FIELD

The present invention relates to a novel device for cutting an electrode assembly and a secondary battery manufactured using the same. More specifically, the present invention relates to a device for cutting an electrode sheet laminate wherein two or more continuous electrode sheets in which an electrode active material is applied to one or both surfaces thereof are laminated to form a plurality of unit electrode laminates from the electrode sheet laminate, the device comprising a cutter to cut the electrode sheet laminate at a set position and thereby form unit electrode laminates; and two or more transport grippers arranged at the front of the cutter based on a feed direction of the electrode sheet laminate, the transport grippers drawing and transporting the electrode sheet laminate by one pitch, a size corresponding to the unit electrode laminate according to operation of the cutter, wherein while one of the transport grippers draws and transports the electrode sheet laminate, the remaining transport grippers move to a position for drawing.

BACKGROUND ART

Recently, rechargeable secondary batteries are widely used as energy sources or auxiliary power devices of wireless mobile devices. In addition, secondary batteries are drawing great attraction as power sources of electric vehicles (EVs), hybrid electric vehicles (HEVs), plug-in hybrid electric vehicles (PHEV) and the like suggested as alternatives to solve air pollution caused by conventional gasoline vehicles, diesel vehicles and the like using fossil fuels.

Such a secondary battery is manufactured in a state in which an electrode assembly is mounted in a battery case together with an electrolyte solution. Depending on the manufacturing method employed, the electrode assembly is divided into a stack-type, a folding-type, a stack-folding type and the like. In the case of the stack type or stack-folding type electrode assembly, a unit assembly has a structure in which a cathode and an anode are laminated in this order such that a separator is interposed therebetween. In order to manufacture such an electrode assembly, manufacture of a unit electrode laminate having a bi-cell or full-cell structure is first required.

In order to manufacture a unit electrode laminate, a process for cutting an electrode sheet laminate, wherein two or more continuous electrode sheets in which an electrode active material is applied to one or both surfaces thereof are laminated, at an interval of unit electrodes is necessary. This cutting process is generally carried out by cutting the laminate using a cutter and a continuous feeding manner is commonly used.

The continuous feeding manner is a method in which a cutter synchronizes with the electrode sheet laminate and, at the same time, cutting is performed. In this manner, the electrode sheet laminate is continuously fed without stop, and the cutter moves together with it and repeats coating. As a result, the cutter moves in a movement direction of the electrode sheet laminate and performs cutting while it moves back and forth periodically at a predetermined distance.

However, the cutting using this continuous feeding manner secures suitable production efficiency when the electrode sheet laminate moves at a low rate, but problems of serious noise, great increase in abrasion and thus decrease in replacement time of the cutter occur at a region where the cutter cuts the electrode sheet laminate when a feeding rate of the electrode sheet laminate is high. As a result, there is a fundamental limit to increase of the feed rate, thus limiting production efficiency.

Accordingly, there is a need for development of novel cutting devices to solve these problems.

DISCLOSURE

Technical Problem

Therefore, the present invention has been made to solve the above and other technical problems that have yet to be resolved.

Specifically, it is an object of the present invention to provide a cutting device that can stably cut an electrode sheet at a high rate.

Technical Solution

In accordance with one aspect of the present invention, provided is a device for cutting an electrode sheet laminate wherein two or more continuous electrode sheets in which an electrode active material is applied to one or both surfaces thereof are laminated, to form a plurality of unit electrode laminates from the electrode sheet laminate, the device comprising:

a cutter to cut the electrode sheet laminate at a set position and thereby form unit electrode laminates; and two or more transport grippers arranged at the front of the cutter based on a feed direction of the electrode sheet laminate, the transport grippers drawing and transporting the electrode sheet laminate by one pitch, a size corresponding to the unit electrode laminate according to operation of the cutter, wherein while one of the transport grippers draws and transports the electrode sheet laminate, the remaining transport grippers move to a position for drawing.

That is, the cutting device according to the present invention has a configuration in which grippers arranged at the front of the cutter alternately draw the electrode sheet by one pitch and the cutter cuts the grippers transferred by operation of the grippers at a set position, thus performing stable cutting even under a rapid feeding condition and considerably increasing cutter replacement time as compared with a conventional transport cutter, thereby considerably improving production rate.

The electrode sheet laminate is, for example, a sheet laminate for manufacturing a full cell and a sheet laminate for manufacturing a bi-cell.

The full cell has a unit structure of cathode/separator/anode in which a cathode and an anode are arranged at both sides of the cell, respectively. Examples of such a full cell include a cathode/separator/anode cell (the most basic structure), cathode/separator/anode/separator/cathode/separator/anode and the like.

In order to constitute an electrochemical cell such as a secondary battery using such a full cell, a plurality of full cells should be laminated such that a cathode and an anode face each other and a separator is interposed therebetween.

The bi-cell is a cell in which identical electrodes are arranged at both sides of the cell, such as a cathode/separator/anode/separator/cathode unit structure or an anode/separator/cathode/separator/anode unit structure. In order to constitute an electrochemical cell such as secondary battery using such a bi-cell, a plurality of bi-cells should be laminated such that a bi-cell having a cathode/separator/anode/separator/cathode structure faces a bi-cell having an anode/separator/cathode/separator/anode structure in a state that a separator is interposed between a cathode and an anode.

In a preferred embodiment, the transport grippers may include a first transport gripper adjacent to the cutter and a second transport gripper arranged at the front of the first transport gripper to alternately draw the electrode sheet laminate. Such a gripper including two grippers will be broadly referred to as a "dual gripper".

Specifically, the dual gripper operates such that, while the first transport gripper draws the electrode sheet laminate and transports the same to the cutter, the second transport gripper returns to the position for drawing and starts to transport the electrode sheet laminate to the cutter immediately after transport of the first transport gripper is finished.

In such a structure, a fix gripper to fix the electrode sheet laminate when the cutter cuts the electrode sheet laminate into unit electrode laminates may be arranged in at least one region of (i) the front of the second transport gripper, (ii) between the first transport gripper and the second transport gripper, and (iii) between the first transport gripper and the cutter. Accordingly, the electrode sheet can be uniformly and stably cut.

In some cases, the device may further include a slitter to slit a width direction (vertical direction) of the electrode sheet laminate after the cutter cuts the electrode sheet laminate in a length direction (longitudinal direction) of the electrode sheet laminate. In this case, after the electrode sheet laminate having two times of a length in a width direction is slit by the slitter, the position of electrode is altered. As a result, production efficiency can be improved two fold as compared to an electrode sheet with a width length.

Any cutter may be used without particular limitation so long as it can easily cut the electrode sheet. For example, the cutter may be a guillotine-type cutter in which a long cutter cuts an electrode sheet while passing downwards.

The cutter is for example driven by a cam to trace transport the electrode sheet in a real time and thereby automatically cut the electrode sheet. In this case, the cam actively operates by obtaining image data from the electrode sheet and analyzing the image data.

In another preferred embodiment, a rear gripper to draw the cut unit electrode laminate and load the same onto a transport conveyer may be further arranged at the rear of the cutter.

Specifically, the rear gripper may include a first rear gripper adjacent to the cutter and a second rear gripper arranged between the first rear gripper and the transport conveyer to alternately draw unit electrode laminates and feed the same to the transport conveyer.

In this structure, while the first rear gripper transports the cut unit electrode laminate to the transport conveyer, the second rear gripper returns to the original position and starts to transport the electrode sheet laminate to the transport conveyer immediately after transport of the first rear gripper is finished.

In the processes of transport of the first rear gripper and return of the second rear gripper to the original position, positions of the first rear gripper and the second rear gripper are switched. As a result, production efficiency can be further improved, as compared to a structure in which the electrode sheet is transferred using one gripper.

The present invention provides an electrode assembly including a plurality of unit electrode laminates manufactured using the cutting device.

The electrode assembly has a structure in which a cathode and an anode are laminated such that a separator is interposed therebetween.

For example, the cathode is produced by applying a slurry prepared by mixing a cathode mixture containing a cathode active material with a solvent such as NMP to a cathode current collector, followed by drying and rolling.

The cathode mixture may further optionally contain a component such as a conductive material, a binder or a filler in addition to the cathode active material.

The cathode active material is, as a substance that causes electrochemical reaction, a lithium transition metal oxide comprising two or more transition metals and examples thereof include, but are not limited to, layered compounds such as lithium cobalt oxide ($LiCoO_2$) or lithium nickel oxide ($LiNiO_2$) substituted with one or more transition metals; lithium manganese oxide substituted with one or more transition metals; lithium nickel oxide represented by the formula of $LiNi_{1-y}M_yO_2$ (in which M=Co, Mn, Al, Cu, Fe, Mg, B, Cr, Zn or Ga, the lithium nickel oxide including one or more elements among these elements, $0.01 \leq y \leq 0.7$); lithium nickel cobalt manganese composite oxides represented by $Li_{1+z}Ni_bMn_cCo_{1-(b+c+d)}M_dO_{(2-e)}A_e$ such as $Li_{1-z}Ni_{1/3}Co_{1/3}Mn_{1/3}O_2$ or $Li_{1+z}Ni_{0.4}Mn_{0.4}Co_{0.2}O_2$ (in which $-0.5 \leq z \leq 0.5$, $0.1 \leq b \leq 0.8$, $0.1 \leq c \leq 0.8$, $0 \leq d \leq 0.2$, $0 \leq e \leq 0.2$, $b+c+d<1$, M=Al, Mg, Cr, Ti, Si or Y, A=F, P or Cl); and olivine lithium metal phosphate represented by the formula of $Li_{1+x}M_{1-y}M'_yPO_{4-z}X_z$ (in which M=transition metal, preferably Fe, Mn, Co or Ni, M'=Al, Mg or Ti, X=F, S or N, $-0.5 \leq x \leq +0.5$, $0 \leq y \leq 0.5$, and $0 \leq z \leq 0.1$).

The conductive material is commonly added in an amount of 1 to 30% by weight, based on the total weight of the mixture comprising the cathode active material. Any conductive material may be used without particular limitation so long as it has suitable conductivity without causing adverse chemical changes in the battery. Examples of conductive materials include conductive materials, including graphite; carbon blacks such as carbon black, acetylene black, Ketjen black, channel black, furnace black, lamp black and thermal black; conductive fibers such as carbon fibers and metallic fibers; metallic powders such as carbon fluoride powders, aluminum powders and nickel powders; conductive whiskers such as zinc oxide and potassium titanate; conductive metal oxides such as titanium oxide; and polyphenylene derivatives.

The binder is a component which enhances binding of an electrode active material to a conductive material and current collector. The binder is commonly added in an amount of 1 to 30% by weight, based on the total weight of the mixture comprising the cathode active material. Examples of the binder include polyvinylidene, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene propylene diene terpolymer (EPDM), sulfonated EPDM, styrene butadiene rubbers, fluororubbers and various copolymers.

The filler is a component optionally used to inhibit expansion of the electrode. Any filler may be used without particular limitation so long as it does not cause adverse chemical changes in the manufactured battery and is a fibrous material.

Examples of the filler include olefin polymers such as polyethylene and polypropylene; and fibrous materials such as glass fibers and carbon fibers.

The cathode current collector is generally manufactured to have a thickness of 3 to 500 μm. Any cathode current collector may be used without particular limitation so long as it has suitable conductivity without causing adverse chemical changes in the manufactured battery. Examples of the cathode current collector include stainless steel, aluminum, nickel, titanium, sintered carbon, and aluminum or stainless steel surface-treated with carbon, nickel, titanium or silver. These current collectors include fine irregularities on the surface thereof so as to enhance adhesion to electrode active materials. In addition, the current collectors may be used in various forms including films, sheets, foils, nets, porous structures, foams and non-woven fabrics.

For example, the anode is produced by applying a slurry prepared by mixing an anode mixture containing an anode active material with a solvent such as NMP to an anode current collector, followed by drying. The anode mixture may further optionally contain components such as a conductive material, a binder or a filler as mentioned above.

Examples of the anode active material include carbon and graphite materials such as natural graphite, artificial graphite, expanded graphite, carbon fiber, hard carbon, carbon black, carbon nanotubes, perylene, activated carbon; metals alloyable with lithium, such as Al, Si, Sn, Ag, Bi, Mg, Zn, In, Ge, Pb, Pd, Pt and Ti and compounds containing these elements; composites of carbon and graphite materials with a metal and a compound thereof; and lithium-containing nitrides. Of these, a carbon-based active material, a silicon-based active material, a tin-based active material, or a silicon-carbon-based active material is more preferred. The material may be used alone or in combination of two or more thereof.

The anode current collector is generally fabricated to have a thickness of 3 to 500 μm. Any anode current collector may be used without particular limitation so long as it has suitable conductivity without causing adverse chemical changes in the battery. Examples of the anode current collector include copper, stainless steel, aluminum, nickel, titanium, sintered carbon, and copper or stainless steel surface-treated with carbon, nickel, titanium or silver, and aluminum-cadmium alloys. Similar to the cathode current collectors, the anode current collectors include fine irregularities on the surface thereof so as to enhance adhesion to electrode active materials. In addition, the current collectors may be used in various forms including films, sheets, foils, nets, porous structures, foams and non-woven fabrics.

The separator is interposed between the cathode and the anode. As the separator, an insulating thin film having high ion permeability and mechanical strength is used. The separator typically has a pore diameter of 0.01 to 10 μm and a thickness of 5 to 300 μm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both a separator and an electrolyte.

The present invention also provides a secondary battery having a structure in which the electrode assembly is sealed together with the lithium salt-containing non-aqueous electrolyte solution in a battery case.

The lithium salt-containing, non-aqueous electrolyte is composed of a non-aqueous electrolyte and a lithium salt and examples of preferred electrolytes include non-aqueous organic solvents, organic solid electrolytes, inorganic solid electrolytes and the like.

Examples of the non-aqueous solvent include non-protic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydroxy franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ethers, methyl propionate and ethyl propionate.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the above-mentioned non-aqueous electrolyte and examples thereof include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imides.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further contain halogen-containing solvents such as carbon tetrachloride and ethylene trifluoride. Further, in order to improve high-temperature storage characteristics, the non-aqueous electrolyte may further contain carbon dioxide gas or the like.

The battery case may be a cylindrical can, a rectangular can or a pouch to which a lamination sheet is thermally bonded. Of these, the pouch-shaped case may be generally used due to advantages such as low weight, low manufacturing cost and easy shape change.

The laminate sheet includes an inner resin layer in which thermal bonding is performed, a barrier metal layer, and an outer resin layer that exerts durability.

The outer resin layer should have superior resistance to exterior environments, thus requiring a predetermined level or more of tensile strength and weather resistance. In this regard, a polymer resin for the outer coating layer may contain polyethylene naphthalate (PEN), polyethylene terephthalate (PET) or oriented nylon that exhibit superior tensile strength and weather resistance.

In addition, the outer coating layer is made of polyethylene naphthalate (PEN) and/or is provided at the outer surface thereof with a polyethylene terephthalate (PET) layer.

Polyethylene naphthalate (PEN) exhibits superior tensile strength and weather resistance even at a small thickness as compared to polyethylene terephthalate (PET) and is thus suitable for use as an outer coating layer.

The polymer resin for the inner resin layer may be a polymer resin that has a thermal bonding property (thermal adhesion property), low hygroscopicity of the electrolyte solution to prevent permeation of the electrolyte solution thereinto and is not expanded or deposited by the electrolyte solution and is more preferably a chlorinated polypropylene (CPP) film.

In a preferred embodiment, the laminate sheet according to the present invention may include an outer coating layer having a thickness of 5 to 40 μm, a barrier layer having a thickness of 20 to 150 μm, and an inner sealant layer having a thickness of 10 to 50 μm. When the thicknesses of respective layers of the laminate sheet are excessively small, barrier performance of the materials and improvement in strength cannot be attained and, on the other hand, when the thicknesses are excessively large, disadvantageously, processability is deteriorated and thicknesses of sheets are increased.

Such a secondary battery may be used for a battery cell used as a power source of small devices as well as a unit battery for middle and large battery modules including a plurality of battery cells used as power sources of middle and large devices requiring high-temperature stability, long cycle characteristics, high rate characteristics and the like.

Examples of preferred middle and large devices include, but are not limited to, power tools powered by battery-driven motors; electric vehicles including electric vehicles (EVs), hybrid electric vehicles (HEVs) and plug-in hybrid electric vehicles (PHEVs); electric two-wheeled vehicles including electric bikes (E-bikes), electric scooters (E-scooter); electric golf carts, electric power storage system and the like.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, the present invention will be described in more detail with reference to the following examples. These examples are provided only to illustrate the present invention and should not be construed as limiting the scope and spirit of the present invention.

Figure 1:
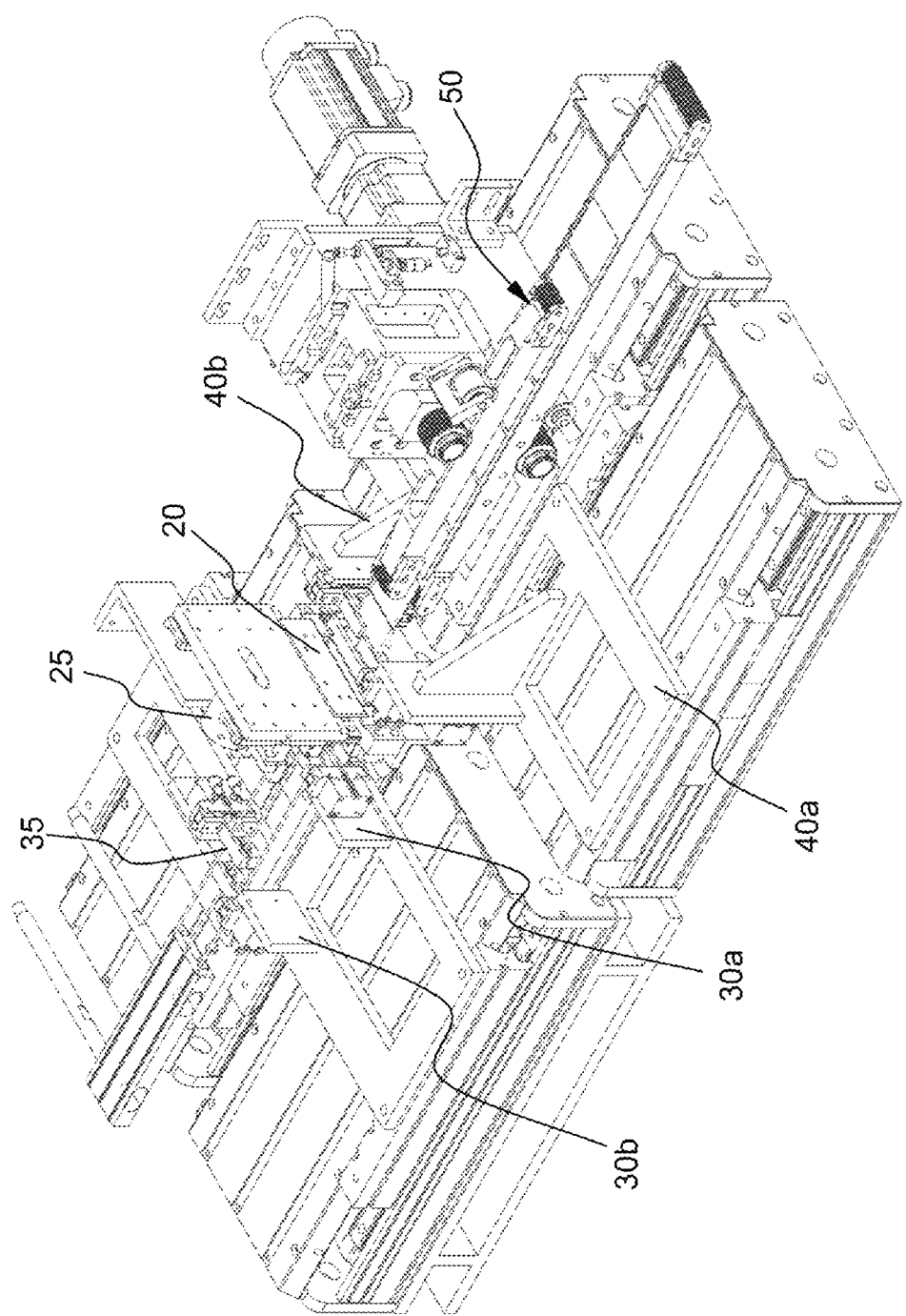
FIG. 1 is a schematic view illustrating a cutting device according to one embodiment of the present invention.
Figure 2:
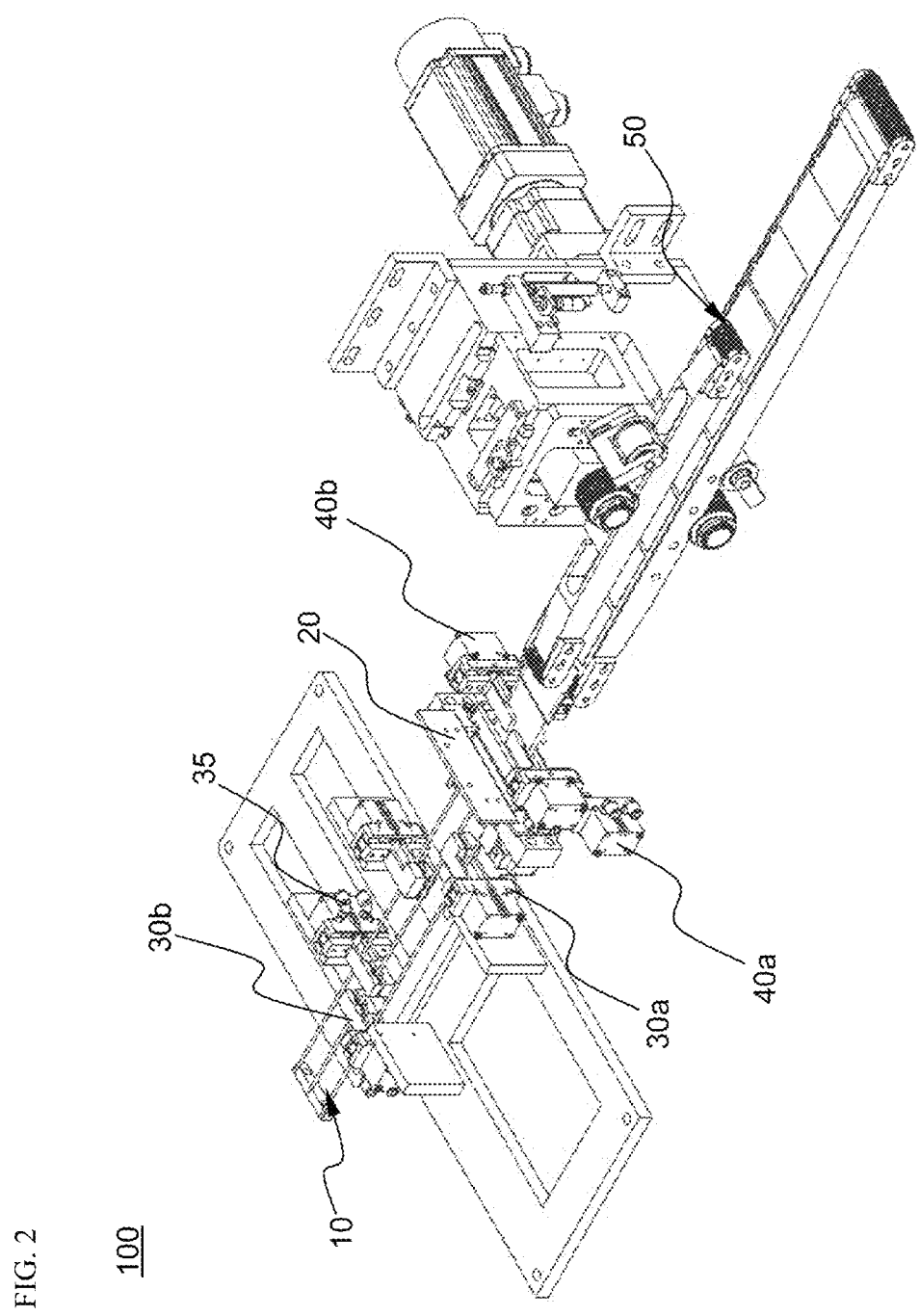
FIG. 2 is a partial schematic view illustrating the cutting device of FIG. 1.
Figure 3:
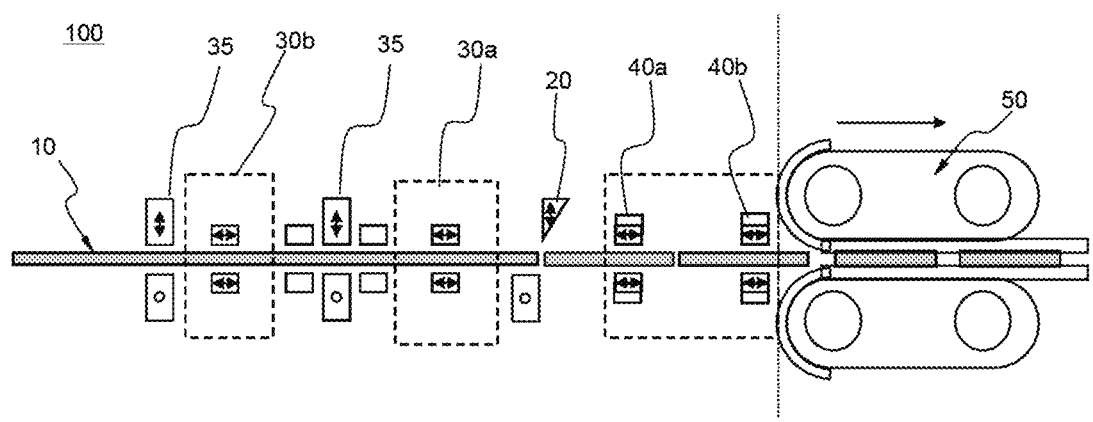
FIG. 3 is a schematic view illustrating a process of the cutting device of FIG. 1.
Figure 4:
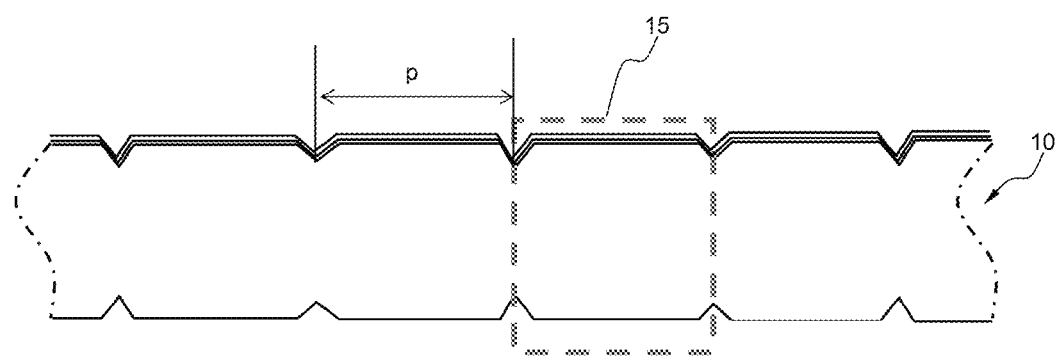
FIG. 4 is a plane schematic view illustrating an electrode sheet laminate of FIG. 1.

FIG. 1 is a schematic view illustrating a cutting device according to one embodiment of the present invention. FIG. 2 is a partial schematic view illustrating the cutting device of FIG. 1. FIG. 3 is a partial schematic view illustrating a process of the cutting device of FIG. 1. FIG. 4 is a plane schematic view illustrating an electrode sheet laminate of FIG. 1.

Referring to these drawings, the cutting device 100 cuts, at an interval of unit electrode laminates, an electrode sheet laminate 10 wherein two or more continuous electrode sheets in which an electrode active material is applied to one or both surfaces thereof are laminated, to form the plurality of unit electrode laminates 15 from the electrode sheet laminate 10.

The electrode sheet laminate 10 is a sheet laminate for manufacturing a full cell including a cathode sheet/separator/anode sheet structure, or a sheet laminate for manufacturing a bi-cell including a cathode sheet/separator/anode sheet/separator/cathode sheet structure or an anode sheet/separator/cathode sheet/separator/anode sheet structure.

The cutting device 100 includes a cutter 20 that cuts the electrode sheet laminate 10 at a set position, and a first transport gripper 30a and a second transport gripper 30b of a dual gripper structure that are arranged at the front of the cutter 20 based on a feed direction of the electrode sheet laminate 10, and draw and transport the electrode sheet laminate 10 by one pitch, a size corresponding to the unit electrode laminate 15 according to operation of the cutter 20.

A guillotine cutter 20 is driven by a cam 25 that obtains digital data of an image, analyzes the image data and thereby performs active cutting.

The electrode sheet 10 is feed to the cutter 20 by a distance (p) between the unit electrode laminates 15 according to the operation of the first transport gripper 30a and the second transport gripper 30b and the distance is referred to as a "pitch (p)".

The first transport gripper 30a is adjacent to the cutter, a second transport gripper 30b is arranged at the rear of the first transport gripper 30a and they alternately draw the electrode sheet laminate 10.

That is, while the first transport gripper 30a draws the electrode sheet laminate 10 and transports the same to the cutter 20, the second transport gripper 30b returns to the position for drawing and transports the electrode sheet laminate to the cutter 20 immediately after transport of the first transport gripper 30a is finished.

As such, two transport grippers 30a and 30b are used and perform the operations above, thereby enabling the cutter 20 to cut at a set position at a high rate and preventing reduction of the lifespan of the cutter 20 in spite of high-rate cutting.

In addition, a fix gripper 35 is arranged at the front of the second transport gripper 30b and between the first transport gripper 30a and the second transport gripper 30b, thus enabling the cutter 20 to easily cut the electrode sheet laminate 10 into unit electrode laminates 15.

In addition to these components, a slitter (not shown) that slits a width direction (vertical direction) of the electrode sheet laminate 10 after the cutter 20 cuts the electrode sheet laminate 10 in a length direction (longitudinal direction) of the electrode sheet laminate may be added.

Meanwhile, a first rear gripper 40a adjacent to the cutter 20, and a second rear gripper 40b arranged between the first rear gripper 40a and the transport conveyer 50 are arranged to alternately draw the cut unit electrode laminates 15 at the rear of the cutter 20 and feed the same to the transport conveyer 50.

Specifically, while the first rear gripper 40a transports the cut unit electrode laminate 15 to the transport conveyer 50, the second rear gripper 40b returns to the original position and starts to transport the electrode sheet laminate 15 to the transport conveyer 50 immediately after transport of the first rear gripper 40a is finished.

Consequently, in the processes of transport of the first rear gripper 40a and return of the second rear gripper 40b to the original position, positions of the first rear gripper 40a and the second rear gripper 40b are switched.

Accordingly, the rear grippers are composed of a pair of a first rear gripper 40a and a second rear gripper 40b that perform the operation defined above, thereby effectively transporting the unit electrode laminate 15 to be rapidly fed during cutting as mentioned above and further improving production efficiency of the overall process.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the afore-going, the cutting device according to the present invention stably cuts the electrode sheet at a high rate while minimizing abrasion of the cutter and, thus reducing costs and greatly improving production efficiency of the overall process through a combination of a dual gripper that feeds the electrode sheet laminate at a high rate and a cutter that repeatedly cuts the electrode sheet laminate at a set position.

The invention claimed is:

1. A device for cutting an electrode sheet laminate, wherein two or more continuous electrode sheets in which an electrode active material is applied to one or both surfaces thereof are laminated, to form a plurality of unit electrode laminates from the electrode sheet laminate, the device comprising:
   a cutter to cut the electrode sheet laminate at a set position and thereby form unit electrode laminates; and
   two or more transport grippers arranged at the front of the cutter based on a feed direction of the electrode sheet laminate, the transport grippers drawing and transporting the electrode sheet laminate by one pitch, a size corresponding to the unit electrode laminate according to operation of the cutter,
   wherein while one of the transport grippers draws and transports the electrode sheet laminate, the remaining transport grippers move to a position for drawing.

2. The device according to claim 1, wherein the electrode sheet laminate is a sheet laminate for manufacturing a full cell including a cathode sheet/separator/anode sheet structure.

3. The device according to claim 1, wherein the electrode sheet laminate is a sheet laminate for manufacturing a bi-cell including a cathode sheet/separator/anode sheet/separator/cathode sheet structure or an anode sheet/separator/cathode sheet/separator/anode sheet structure.

4. The device according to claim 1, wherein the transport grippers comprise a first transport gripper adjacent to the cutter and a second transport gripper arranged at the rear of the first transport gripper to alternately draw the electrode sheet laminate.

5. The device according to claim 4, wherein, while the first transport gripper draws the electrode sheet laminate and transports the same to the cutter, the second transport gripper returns to the position for drawing and starts to transport the electrode sheet laminate to the cutter immediately after transport of the first transport gripper is finished.

6. The device according to claim 4, wherein a fix gripper to fix the electrode sheet laminate when the cutter cuts the electrode sheet laminate into unit electrode laminates is arranged in at least one region of (i) the front of the second transport gripper, (ii) between the first transport gripper and the second transport gripper, and (iii) between the first transport gripper and the cutter.

7. The device according to claim 1, further comprising a slitter to slit a width direction (vertical direction) of the electrode sheet laminate after the cutter cuts the electrode sheet laminate in a length direction (longitudinal direction) of the electrode sheet laminate.

8. The device according to claim 1, wherein the cutter is a guillotine-type cutter.

9. The device according to claim 1, wherein the cutter is driven by a cam.

10. The device according to claim 1, wherein a rear gripper to draw the cut unit electrode laminate and load the same on a transport conveyer is further arranged at the rear of the cutter.

11. The device according to claim 10, wherein the rear gripper comprises a first rear gripper adjacent to the cutter and a second rear gripper arranged between the first rear gripper and a transport conveyer to alternately draw the electrode sheet laminate.

12. The device according to claim 11, wherein, while the first rear gripper transports the cut unit electrode laminate to the transport conveyer, the second rear gripper returns to the original position and starts to transport the electrode sheet laminate to the transport conveyer immediately after transport of the first rear gripper is finished.

13. The device according to claim 12, wherein, in the processes of transport of the first rear gripper and return of the second rear gripper to the original position, positions of the first rear gripper and the second rear gripper are switched.

14. An electrode assembly manufactured using the device according to claim 1.

15. A secondary battery wherein the electrode assembly according to claim 14 is sealed together with an electrolyte solution in a battery case.

16. A battery pack comprising two or more of the secondary batteries according to claim 15 as a unit battery.

17. The battery pack according to claim 16, wherein the battery pack is used as a power source of an electric vehicle (EV), a hybrid electric vehicle (HEV), a plug-in hybrid electric vehicle (PHEV) or an electric power storage system.

18. The device according to claim 1, wherein the cutter cuts in a direction transverse to the feed direction.

* * * * *